(12) United States Patent
Minowa

(10) Patent No.: US 7,355,737 B2
(45) Date of Patent: Apr. 8, 2008

(54) APPARATUS AND METHOD FOR TWO-COLOR PRINTING BASED ON SINGLE COLOR DATA

(75) Inventor: Masahiro Minowa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 988 days.

(21) Appl. No.: 10/300,977

(22) Filed: Nov. 21, 2002

(65) Prior Publication Data
US 2003/0184774 A1 Oct. 2, 2003

(30) Foreign Application Priority Data
Apr. 1, 2002 (JP) .............................. 2002-099210

(51) Int. Cl.
G06F 15/00 (2006.01)

(52) U.S. Cl. .................... 358/1.15; 358/515; 382/162; 382/165; 235/2; 235/3; 235/432; 283/30; 283/60.1; 283/60.2; 705/16; 705/24; 902/18; 902/22; 902/36

(58) Field of Classification Search ............... 358/1.15, 358/515; 382/162; 235/432, 2–3; 283/30, 283/60.1–60.2; 902/18, 22, 36; 705/24, 705/16
See application file for complete search history.

(56) References Cited

U.S. PATENT DOCUMENTS

| | | | |
|---|---|---|---|
| 4,857,955 A * | 8/1989 | Crandall .................... 358/1.9 |
| 5,113,356 A * | 5/1992 | Nickell et al. ............... 358/1.8 |
| 5,572,599 A | 11/1996 | Tse ............................ 382/162 |
| 6,229,623 B1 * | 5/2001 | VerMurlen ................... 358/1.9 |
| 6,425,653 B1 * | 7/2002 | Bloomberg .................. 347/43 |
| 6,523,937 B1 * | 2/2003 | Payne ......................... 347/43 |
| 6,817,289 B1 * | 11/2004 | Liebenow .................... 101/211 |
| 6,847,377 B2 * | 1/2005 | Kitahara et al. ............. 345/600 |
| 6,934,054 B1 * | 8/2005 | Hilsdorf et al. .............. 358/1.9 |
| 6,995,867 B2 * | 2/2006 | Nye ............................ 358/1.9 |
| 7,085,006 B2 * | 8/2006 | Yokoyama et al. .......... 358/1.9 |
| 2002/0039441 A1 * | 4/2002 | Klassen ...................... 382/166 |
| 2002/0175964 A1 * | 11/2002 | Ames et al. .................. 347/19 |

FOREIGN PATENT DOCUMENTS

| | | |
|---|---|---|
| EP | 1 342 578 | 9/2003 |
| JP | 6-127040 | 5/1994 |
| JP | 08-052911 | 2/1996 |
| KR | 1999-0038221 | 6/1999 |
| WO | 02/13131 | 2/2002 |

* cited by examiner

Primary Examiner—Twyler Lamb
Assistant Examiner—Mark R. Milia
(74) Attorney, Agent, or Firm—Rosalio Haro

(57) ABSTRACT

A printer 10 has a reception unit 28 for receiving print commands from a host 12, and has print heads 64, 66 capable of printing multiple colors. A data processing part 24 applies a specific colorization process according to a print command received by a reception unit 28 and generates color print data for printing multiple colors. The content of a colorization process is determined by colorization information stored in a colorization information storage unit 62. The colorization information is set by a data configuration unit 26 according to a color setup command from the host 12.

23 Claims, 4 Drawing Sheets

| FIELD | VALUE |
|---|---|
| COLORIZATION FLAG | SET (ENABLE) OR CLEAR (DISABLE) |
| IMAGE COLOR | FIRST COLOR OR SECOND COLOR |
| TEXT COLOR | FIRST COLOR OR SECOND COLOR |
| TEXT BACKGROUND | ON OR OFF |
| TEXT LINE UNIT | INTEGER VALUE |
| DOUBLE-STRIKE COLOR | FIRST COLOR OR SECOND COLOR |
| UNDERLINED TEXT COLOR | FIRST COLOR OR SECOND COLOR |

Fig.2

| FIELD | VALUE |
|---|---|
| COLORIZATION FLAG | SET (ENABLE) OR CLEAR (DISABLE) |
| IMAGE COLOR | FIRST COLOR OR SECOND COLOR |
| TEXT COLOR | FIRST COLOR OR SECOND COLOR |
| TEXT BACKGROUND | ON OR OFF |
| TEXT LINE UNIT | INTEGER VALUE |
| DOUBLE-STRIKE COLOR | FIRST COLOR OR SECOND COLOR |
| UNDERLINED TEXT COLOR | FIRST COLOR OR SECOND COLOR |

Fig.3

```
SHINSHU ·· SUPERMARKET
        ··STORE 2002-2-14      } 2 LINES
301─  BEEF         500g    ¥  380
      EGGS          10     ¥  200  } 2 LINES
      MILK       1CARTON   ¥  178
      ORANGE JUICE 1CARTON ¥  210  } 2 LINES
      CHOCOLATE    2PCS    ¥  230
      CARROTS             ¥   430  } 2 LINES
      LETTUCE             ¥   150
      CUP NOODLE    5     ¥   620  } 2 LINES
      FILLED DONUTS 3     ¥   300
      DETERGENT   1CASE   ¥   520  } 2 LINES
      TOILET PAPER 1PACK  ¥   392
      TISSUE PAPER 5BOXES ¥   298  } 2 LINES
      TOTAL               ¥  3914
```

APPARATUS AND METHOD FOR TWO-COLOR PRINTING BASED ON SINGLE COLOR DATA

DETAILED DESCRIPTION OF THE INVENTION

Technical Field of the Invention

The present invention relates to a printer having means for generating color print data from single-color data, and to a control method for a printer for converting single-color data to color print data and printing, a program for executing this method on a computer, and a computer-readable recording medium for recording this program. The present invention further relates to a POS system using a printer capable of printing multiple colors.

Prior Art

POS systems used at store check-out registers have a printer for printing receipts. These POS printers print sale information including the name and price of each purchased product line by line on roll paper or other printing medium, and the printed paper is then cut and issued as a receipt. The customer receiving this receipt may later transfer product name and price information from the receipt to a home budget ledger, for example, to keep the ledger as a personal record of past purchases. Most such receipts are printed with one color, often making the printed content difficult to read. Errors can thus easily occur when transferring information from the receipt to the ledger.

Problem to be Solved by the Invention

In the last few years color inkjet and thermal transfer printers for use with personal computers have become widely available. Color printers capable of printing two or more colors for use with POS systems are also becoming more common. Using these printers to print receipts in color can make the receipts easier to read and is thus desirable for improved customer service.

Many application programs used in POS systems, however, were written assuming that a conventional monochrome printer would be used. This has meant that even if the printer has a color printing capability, the application program must be modified in order to print receipts in color. Changing this type of application program is typically costly, and the financial burden on the POS user, that is, store, is thus great. It is therefore desirable to be able to print receipts in color while continuing to use as-is existing application programs that presume use of a monochrome printer.

The present invention is directed to solving these problems, and an object of the invention is to provide a printer and a printer control method capable of printing in multiple colors based on a print command for single-color printing. Another object of the invention is to enable externally setting the format for such color printing by means of a setup command applied to the printer.

Means for Solving the Problem

To achieve this object the present invention is a printer having a reception means for receiving a print command from an external source and a printing means capable of printing in multiple colors, characterized by comprising a command interpreting means for interpreting print commands received by the reception means, a print data processing means for applying a specific colorization process to character data corresponding to a specific command and generating color print data for printing in multiple colors by means of the printing means, and a control means for printing by means of the printing means based on the generated color print data.

The present invention thus applies a colorization process to a print command for single-color printing to generate color print data, and then prints based on this color print data. A printer according to the present invention can thus print in multiple colors based on a monochrome print command.

In a printer according to the present invention the command interpreting means has an evaluation means for determining if a received print command is a text print command for styled text or a text print command for normal text, and the print data processing means applies a colorization process to character data for a specific command based on the result from the evaluation means to generate the color print data.

By thus applying the colorization process and generating the color print data after determining if a specific character style is specified in the print command instructions, normal text and styled text can be differentiated and printed in different colors based on specific text style commands while printing based on a single-color print command.

A printer according to a preferred embodiment of the invention prints two colors, a first color of black and a second color that is a color other than black, and the print data processing means can be configured to enable two-color printing by running a process for normally printing with the first color and printing character data corresponding to a specific command with the second color. This enables printing specific text in the second color, such as red or blue, and thus improves print readability particularly with a receipt printer.

A printer according to the present invention could further comprise a storage means for storing colorization information specifying colorization process content, the print data processing means running the colorization process according to the colorization information.

A printer according to the present invention could further comprise a setup means for setting the colorization information according to a specific setup command received by the reception means. This enables the format for printing multiple colors to be set by a setup command sent to the printer from an external source.

Examples of text style commands include ESC E for specifying bold text and ESC G for specifying double-strike text, and when printing such styled text the printer of this invention can automatically convert and print this text in color even if it is data for monochrome printing.

Colorization information in the printer is set in the present invention by the simple operation of entering each item of colorization information to the corresponding entry fields of an input screen.

A printer system can also be configured from the colorization setup information and printer according to the present invention.

A printer system can also be configured from a printer according to the present invention and a host device for sending print commands to the printer.

Furthermore, in a POS system having a printer according to the present invention and a host device for sending print commands to the printer, the host device has a POS application execution unit for tabulating sales information based on product information input from a specific input device and outputting data for receipt printing, the print command sent by the host device being generated based on the data for receipt printing output from the POS application execution unit.

Embodiment of the Invention

FIG. 1 is a block diagram of a POS system according to a preferred embodiment of the present invention. As shown in the figure a POS system according to this embodiment of the invention has a printer 10 and host 12.

The printer 10 is, for example, an inkjet printer or other type of printer capable of color printing in at least two colors, a first color (such as black) and a second color (such as red or blue), and is used to print receipts according to print commands sent from the host 12 as noted above. As further described below the printer 10 is not limited to a two-color color printer and could be a color printer capable of printing three or more colors. The printer is also not limited to an inkjet printer, and could be a thermal transfer printer or any other type of printer capable of printing multiple colors.

The host 12 is a computer system, and control of the printer 10 within the host 12 is handled by, for example, an OLE for Retail POS ("OPOS" below) printer driver that runs under the Windows (R) operating system. OPOS provides a POS application program 13 running on the OS with a device-independent interface to such peripheral devices as the printer 10 and input devices 14 such as a barcode reader. To achieve this functionality OPOS has a device control object (CO) 15 for each device category and a service object (SO) 16 for each device model.

The POS application program 13 tabulates sales data based on product codes input from the input device 14, and outputs print data for printing the tabulated result as a receipt. The receipt printing data output from the POS application program 13 is passed to the printer CO 15, and is passed from the CO 15 to the SO 16 corresponding to the particular printer 10 model. The SO 16 processes the receipt printing data for the printer to generate a print command according to the command specifications of the printer 10, and then sends the print command to the printer 10 through the OS 17. The SO 16 thus absorbs differences between different models of devices (printers in this embodiment), and thus enables the POS application program 13 to be written as a program that is not dependent on a particular device model.

A colorization setup program 18 for setting the colorization information stored in the printer 10 as further described below is embedded in the service object (SO) 16. The colorization setup program 18 provides a user interface for presenting a specific configuration screen on the display 19 for setting the colorization information.

The print commands sent from the host 12 to the printer 10 are commands for printing text (referred to below as "text print commands") and commands for printing images (referred to below as "image print commands"), and the printer 10 can print text and images according to these print commands. Furthermore, the print commands output by the host 12 in the present embodiment are single-color print commands, and the printer 10 has a function for applying a colorization process to these monochrome print commands and printing with two colors (this is referred to as a "colorization function" below).

ESC *, ESC L, and GS /, for example, are used as image print commands. Image printing is used in this embodiment to print a store logo, for example, stored in the printer 10 to a receipt, and the command "GS /" is used in this case. Because a specific command code is thus used for the image print command, the printer 10 can differentiate between image print commands and text print commands.

A text style command for applying styles to letters is also provided for text printing. For example, ESC E can be used to specify bold, ESC G can be used to specify double-strike, and ESC—can be used to specify underlined text. When this type of text is printed it can be differentiated from normal unstyled text by interpreting the commands, even when the data is for single color printing.

As shown in FIG. 1 the printer 10 has a central control unit 20, a command interpreter 22, a data processing part 24, a data configuration unit 26, and a reception unit 28. The central control unit 20 interprets print commands received by the reception unit 28 from the host 12 through an interface 30 by means of the command interpreter 22, and runs a process corresponding to the specific command. It should be noted that the central control unit 20, command interpreter 22, data processing part 24, and data configuration unit 26 are functional units achieved by the CPU 40 running a specific control program.

Connected to the CPU 40 are RAM 42, ROM 44, a first head control unit 46, and a second head control unit 48.

A receive buffer 50, first print buffer 52, and second print buffer 54 are provided in RAM 42. Print commands received by the reception unit 28 from the host 12 are stored to the receive buffer 50. Bit data for printing the first color is stored to the first print buffer 52 and bit data for printing the second color is stored to the second print buffer 54.

Provided in ROM 44 are program storage unit 56 for storing the control program run by the CPU 40, CG storage unit 58 for storing bit pattern data for text, symbols, and other characters and bit pattern data for a background added to the text, image storage unit 60 for storing bit image data for the store logo or other image printed to the receipts, and colorization information storage unit 62 for storing the colorization information described below. It should be noted that ROM 44 is composed of rewritable ROM such as EEPROM and a mask ROM or non-writable ROM storing firmware embedded in the CPU 40. The program storage unit 56 is disposed to non-rewritable ROM, and the CG storage unit 58, image storage unit 60, and colorization information storage unit 62 are disposed to rewritable ROM. The CG storage unit 58, however, could be disposed to either ROM space.

A first print head 64 and second print head 66 are respectively connected to the first head control unit 46 and second head control unit-48. The first print head 64 and second print head 66 are print heads for respectively printing the first color and second color. Print data stored in the first print buffer 52 and second print buffer 54 is printed using the first color and second color, respectively, by the first head control unit 46 and second head control unit 48.

The command interpreter 22 interprets print commands stored to the receive buffer 50 and determines if the print command is a text print command or image print command. The result is passed with the print data specified by the print command to the data processing part 24. Based on the received data the data processing part 24 stores the print data in a bit data format to the first print buffer 52 and second print buffer 54 as further described below.

If the colorization function noted above is not enabled, that is, if the colorization flag stored to the colorization information storage unit 62 described below is not set, the data processing part 24 reads the bit pattern data for each character to be printed from the CG storage unit 58 for print data in a text print command, and stores the data to the first print buffer 52. For image print commands the bit image data for the image to be printed is read from the image storage unit 60 and stored to the first print buffer 52. The first print head 64 is then driven to print data stored to the first print buffer 52 in one color, i.e., the first color.

If the colorization function is enabled, the data is printed in two colors by means of the data processing part 24 running a specific colorization process according to the content of the colorization information stored to the colorization information storage unit 62. Details of this colorization process are described further below.

If a text style is applied by a style command such as an underline command or a double-strike command while executing a text print command, the content (further described below) of the colorization information corresponding to that command is referenced to determine if a colorization process is specified. For example, if a colorization process is indicated in the colorization information for printing underlined text; the specified colorization process is applied to the text, symbols, and other character data for the particular command specifying the text style, print data for the specified characters is generated in the receive buffer, and stored to the print buffer of the second head for printing the second color.

FIG. 2 shows an example of the content of the colorization information stored to the colorization information storage unit 62. As shown in the figure the colorization information contains such fields as the colorization flag, image printing color, text printing color, whether there is a text background, the text line unit, the color for printing double-strike text, and the color for printing underlined text. These settings are converted to specific data, stored to the colorization information storage unit 62, and used as a lookup table.

(1) Colorization flag: Declares whether the colorization function is enabled or disabled. (If the flag is set the colorization function is enabled.)

(2) Image printing color: Specifies whether to use the first or second color for printing images.

(3) Text printing color: Specifies whether to use the first or second color for printing text.

(4) Text background flag: Specifies whether to add a background color to text.

(5) Text line unit: Declares the number of lines in one line unit for applying the colorization process. For example, if the line unit value is 2, two lines to which the colorization process is applied and two lines to which the process is not applied alternate as shown in FIG. 3.

(6) Double-strike printing color: Specifies whether to use the first or second color for printing double-strike text.

(7) Underlined text printing color: Specifies whether to use the first or second color for printing underlined text. By adding additional control data, it is also possible to colorize both the underline and the text. It is also possible to specify whether only the underline should be colorized. The print result 301 shown in FIG. 3 shows an example in which an underline printed in the second color is applied. The content of the above colorization information can be set by sending a specific color setup command from the host 12 to the printer 10. The color setup command could be formatted with the command code and parameters shown below, for example.

ESC X n1, n2, n3, n4, n5, n6, n7 where parameters n1 to n7 correspond to the above fields (1) to (7) in the colorization information and are declared as follows.

n1: Declares whether the colorization function is enabled (enable=1; disable n2: Declares whether to print images with the second color (second color=1; first color=0)

n3: Declares whether to print text with the second color (second color=1; first color=0)

n4: Declares whether to print the text background with the second color (print=1; do not print=0)

n5: Specifies the number of lines in one line unit in (5) above.

n6: Declares whether to print double-strike text with the second color (second color=1; first color=0)

n7: Declares whether to print underlined text with the second color (second color=1; first color=0)

It should be noted that each parameter in the above example has a 1-byte data format, but it is not necessary to assign one byte to each field of the colorization information, and one byte could be used for multiple fields so as to reduce the number of parameters. For example, if n3 is set to print text with the second color, a flag for selecting whether normal text is printed or styled text is printed could also be assigned to a particular bit of n3. Furthermore, if printing in the second color is specified for styled text, flags for indicating whether the double-strike style is used, underlining is used, or both are used could also be assigned to specific bits in parameter n3. If the number of configurable items is 8 bits or less, then all of the above parameters could be declared in a 1-byte data format.

When the printer 10 receives this color setup command it specifies the content of the colorization information by means of the data configuration unit 26.

It should be noted that the above command code ESC X is defined by the printer manufacturer. Any code that can be differentiated from other commands and interpreted by a specific printer can therefore be used as the above-noted command code ESC X.

FIG. 4 is a flow chart of the process run by the data processing part 24 when the colorization function is enabled, that is, when the colorization flag is set. As shown in the figure, whether the print command is a text print command or image print command is determined first (S100). If it is an image print command, the bit image data for the image specified in the print command is read from the image storage unit 60 (S102). The bit image data is then stored to the first print buffer 52 or second print buffer 54 according to the value of the image printing color in the colorization information (S104). More specifically, if the image printing color is set to the first color, the image data is stored to the first print buffer 52, which is assigned to the first color, but if the image printing color is set to the second color, the image data is stored to the second print buffer 54, which is used for the second color.

On the other hand, if the print command is a text print command, the colorization process is applied to the normal style text specified for printing by the print command or to text for printing in a specified style based on the colorization information (S106).

FIG. 5 is a flow chart showing the content of a text colorization process in step S106 above.

As shown in FIG. 5 the first step is determining whether to colorize normal style text or to colorize styled text (S110). If normal text (S110 returns yes), the colorization process is applied to the normal text specified by the print command for printing based on the colorization information (S111). If styled text (S110 returns no), whether colorization of double-strike text is indicated is determined (Si12). If it is (S112 returns yes), the colorization process is applied to the double-strike text (S113). If it is not (S112 returns no), whether colorization of underlined text is indicated is determined (S114). If it is (S114 returns yes), the colorization process is applied to the underlined text (S115).

Double-strike text and underlined text are described in the present embodiment as examples of styled text, but other text style commands are also available, including bold, italic, and inverted text styles, and the colorization process can be likewise applied to these other styles.

FIG. 6 is a flow chart of a colorization process for normal style text executed in step S111 above.

As shown in the figure, whether the colorization process is to be applied to the current line is first determined based on the line unit value in the colorization information (S200). It should be noted that the data processing part 24 counts which line the current line is by counting the carriage return codes in the text, and determines whether the colorization process is to be applied to the current line based on the counted current line number and the line unit value. If the result of this determination is that the colorization process is not to be applied to the current line (S200 returns no), bit pattern data for the text is read from CG storage unit 58, stored to the first print buffer 52, and this process ends.

However, if the colorization process is to be applied to the current line (S200 returns yes), bit pattern data for the text is read from CG storage unit 58 and stored to first print buffer 52 or second print buffer 54 according to the text printing color in the colorization information (S204). More specifically, if the color for printing text is the first color, the data is stored to the first print buffer 52, but if it is the second color, the data is stored to the second print buffer 54. Whether the text background flag in the colorization information is set is then determined (S206); if not (S206 returns no), the process ends. If it is (S206 returns yes), the bit pattern data for the background pattern is read from the CG storage unit 58 and stored to the second print buffer 54 (S208), and the process then ends.

The data processing part 24 thus stores print data to the first print buffer 52 or second print buffer 54 according to the colorization information for both text print commands and image print commands. As described above, data is thus printed in the first color and second color according to the print data stored to the first print buffer 52 and second print buffer 54, respectively. The above-described process applied by the data processing part 24 therefore enables printing a two-color receipt such as shown in the example in FIG. 3 according to the content of the colorization information based on a single-color print command.

It should be noted that the print data stored to the first print buffer 52 and second print buffer 54 in steps S104, S202, and S208 in this embodiment corresponds to the color print data of this invention.

Setting the colorization information in the host 12 in this embodiment is described next. The colorization information can be set by running a colorization setup program 18 on the host 12. When the colorization setup program 18 is started up a settings window 100 such as shown in FIG. 7 is presented on the display 19 of the host 12.

As shown in the figure this settings window 100 has a field 102 for selecting two-color printing (i.e., turning the colorization function on or off), a field 103 for setting the image printing color, a field 104 for setting the text printing color, a normal text color field 105 for setting how text color is applied in the colorization process, a styled text color field 106 for likewise setting how text color is applied in the colorization process to styled text, a field 107 for setting whether the text style is double-strike, a field 108 for setting underlined text, a field 109 for setting a text background, a field 110 for setting the number of lines in each line unit, and an OK button 101. When the colorization setup program 18 starts up a command is sent to the printer 10 to read the colorization information, and the content of the colorization information returned from the printer 10 in response to this command is initially displayed in the corresponding fields in the settings window 100.

When the OK button 101 in the settings window 100 is clicked a print command that is a color settings command is generated and sent to the printer 10 based on the content of each field setting.

For example, if two-color printing is on, the image printing color is set to the second color, the text printing color is set to the first color, the text background is on, and the line unit count is 2, the color settings command ESC X 1101 2 nm is sent. The data configuration unit 26 of the printer 10 then sets the colorization information based on this color settings command. Parameters n, m are parameters for setting text styles, specific values are defined, and a colorization process is applied accordingly to the specific styled text. With the example shown in FIG. 2, for example, the colorization process can be specified for two types of text styles, double-strike and underline, in which case parameters can be separately assigned to each style. If it is desirable to increase the number of text styles, compatibility with the bold style noted above and numerous other styles can be maintained by assigning the styles to particular parameter bits.

When a single-color print command is sent from the host 12 to the printer 10 in this embodiment of the invention the colorization function of the printer 10 applies a colorization process according to the colorization information to add a second color and print in two colors. As a result, even if the POS application program 13 run by the host 12 is only compatible with a monochrome printer, printer 10 can be used to print in multiple colors without making any changes to the program or printer driver on the host 12 side. It is therefore possible with this embodiment of the present invention to issue easy-to-read receipts printed in multiple colors without financially burdening the POS system user, i.e., store. More specifically, this printer 10 can be installed in a store without changing the existing POS system program, the work and cost involved in updating the system can be reduced, and the usage value can be improved for the store.

This embodiment of the invention can also differentiate between image print commands and text print commands, and can define the content of the colorization process separately for text and images. A store logo, for example, can therefore be printed in the color preferred by the store while still being able to issue easy-to-read receipts in multiple colors. Therefore, if the store has a specific corporate color that color can be used to print a store logo, for example, and impress upon the customer a positive association between that color and the store.

Furthermore, because the colorization information stored in the printer 10 is set according to a color settings command sent from the host 12, the content of the colorization process can be defined on the host 12 side by the user without directly operating the printer 10. In addition, because the colorization information can be set by simply activating the colorization setup program 18 and entering the desired values and settings from a settings window 100 such as shown in FIG. 7, an easy-to-use interface can be provided for the user. Yet further, because the content of the current colorization information is presented automatically as the default values in the settings window 100 when the colorization setup program 18 is activated, the user can readily know what the current settings are.

In a two-color inkjet printer used as an example of printer 10, the frequency of printing in the second color of ink is low and the second color of ink is therefore not consumed as quickly as the first color. Ink of the second color is therefore left loaded in the printer 10 for a long time, inviting an increase in ink viscosity and change in the ink composition that can become a cause of such trouble as ink clogging the print head. This embodiment of the invention addresses this problem by adding the second color and printing with two colors in response to single-color print commands sent from the host 12. The second color of ink is therefore used with approximately the same frequency as the first color of ink, and print head clogging and other such problems can therefore be prevented.

It will also be noted that while the colorization information in this embodiment is described as specifying the content of the colorization process using such fields as the image printing color, text printing color, text background on/off flag, and the line unit for text to be colored, these fields are used by way of example only. For example, instead of applying the colorization process by text line unit as in this embodiment, a single print color could be specified for all text. Furthermore, a number of patterns, such as a halftone, diagonal slashes, and solid fill, can also be stored in the printer 10 so that a desired pattern can be selected.

The printer 10 shall also not be limited to printing two colors, a first color and second color, and could be designed to print a mixed color by simultaneously printing the first and second colors. In this case each of the printing colors defined in the colorization information could be selected from among three colors: the first color, second color, and a mixture thereof. Color data for which the mixed color is selected in this case is stored to both the first print buffer 52 and second print buffer 54 of the printer 10 and the same pattern is printed by the first print head 64 and second print head 66 to print the color blend. If the printer 10 has a print head and a function for printing three or more colors, the image and text printing colors can be similarly selected from any of the colors printable by the printer 10.

Various printing features can thus be used as the colorization information. What is important is that the present invention makes it possible to use the colorization information to specify how to print in multiple colors, and the color settings command has a format able to specify the content of each setting corresponding to the features defined in the colorization information.

It should also be noted that this embodiment of the invention is described with application to printing receipts in a POS system, but the invention shall not be so limited and can be widely applied to printing multiple colors based on a single-color print command by means of a printer capable of printing multiple colors.

In a preferred embodiment of a printer according to the present invention two colors, black as the main first color and a color other than black as a secondary color, are described as the printing colors, but the main color need not be restricted to black and a combination such as blue as the main color and red as the secondary color could be used. A configuration enabling a mixture of the main and secondary colors is also possible in this case.

A receipt printer configured as described above could, for example, improve the visual impact by printing receipts on sale days using a color different than normally used, thereby enhancing the effect of advertising to customers.

Effect of the Invention

As described, above the present invention enables printing in multiple colors based on a print command for a single color. A POS printer can therefore be installed in a store without changing the existing POS system program, reducing the work and cost involved with changing the system, and thus increasing the usage value for the store.

It is also possible to externally control how printing in multiple colors is applied by means of a color setup command sent to the printer.

BRIEF DESCRIPTION OF THE DRAWINGS

FIG. 2 shows an example of the content of the colorization information.

FIG. 3 shows a sample printout of a receipt according to this embodiment of the invention.

Figure 1:
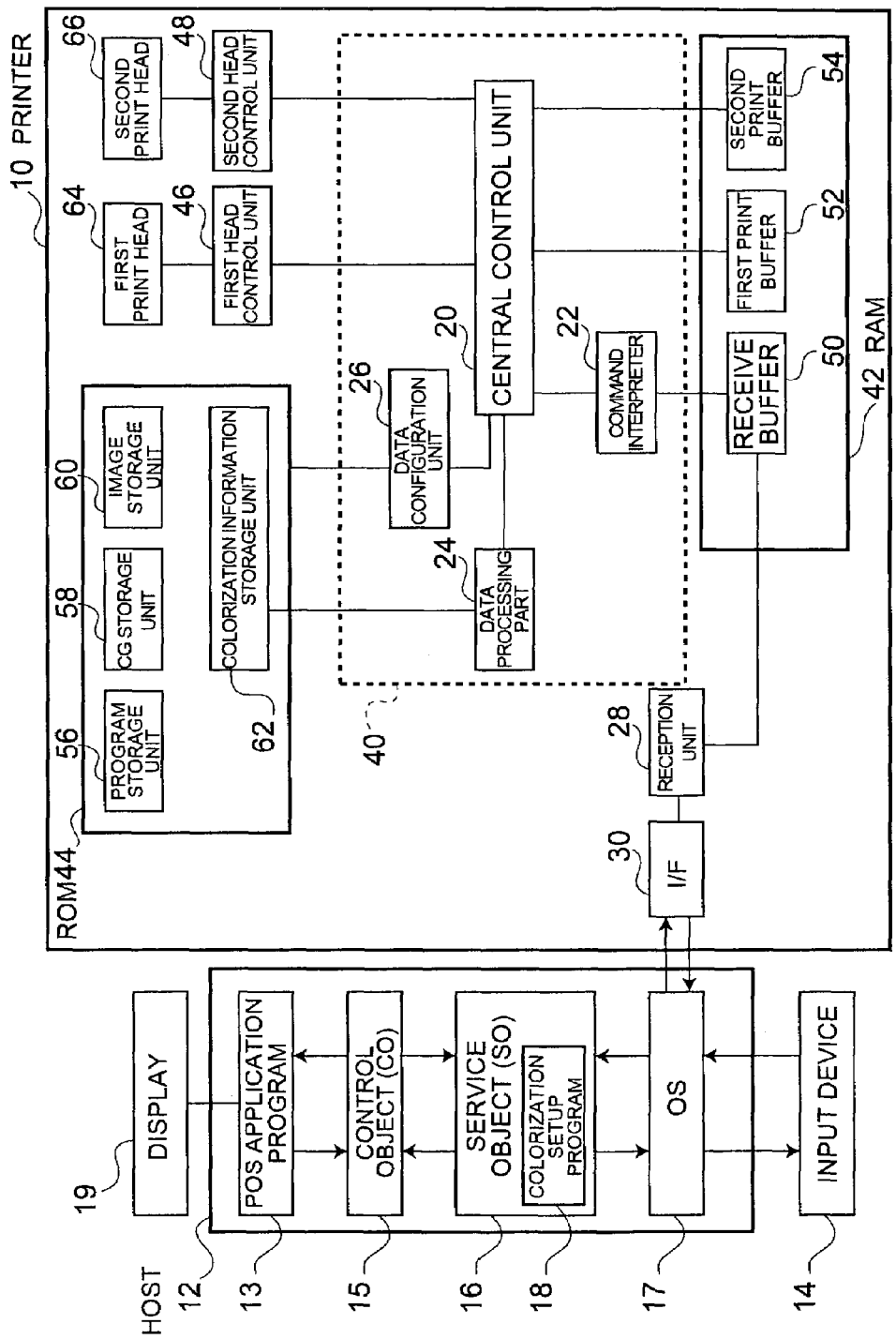
FIG. 1 is an overview of a POS system according to a preferred embodiment of the invention.
Figure 4:
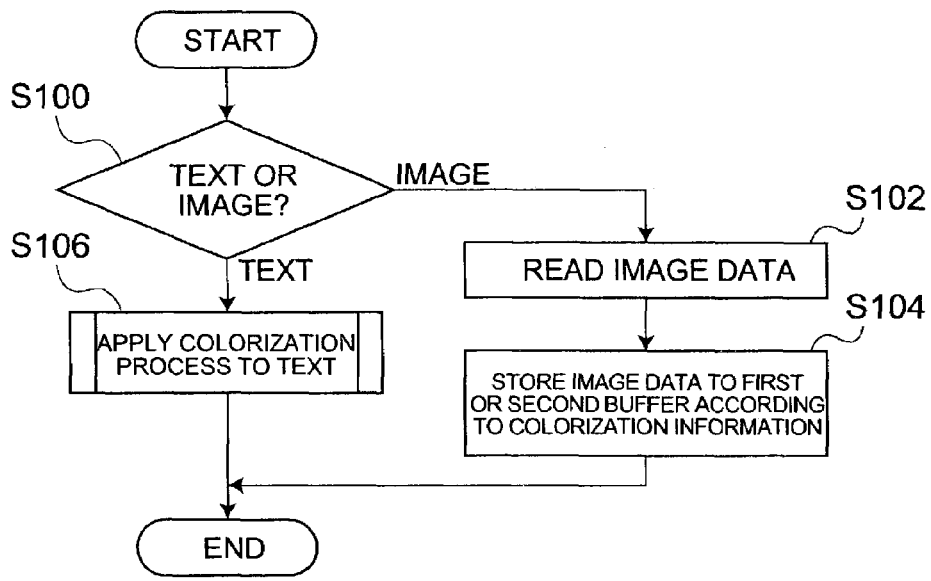
FIG. 4 is a flow chart showing a process run by a data processing part when the colorization function is enabled.
Figure 5:
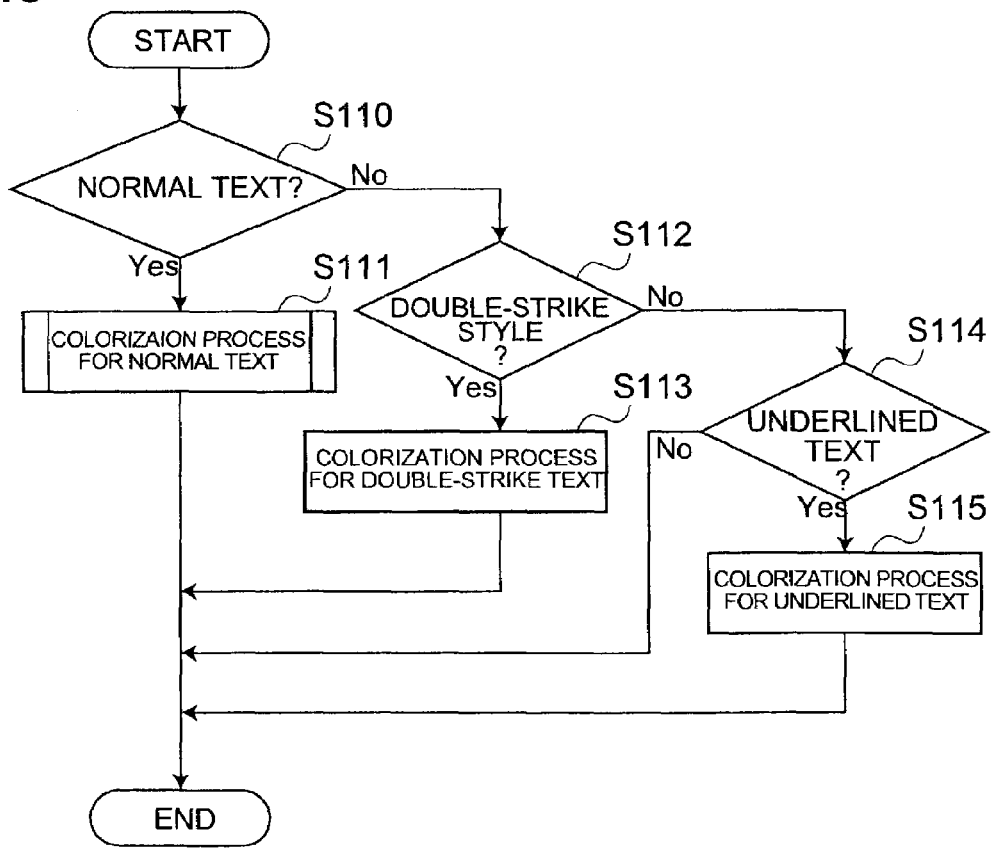
FIG. 5 is a flow chart showing a colorization process that includes recognizing normal characters and styled characters in the text.
Figure 6:
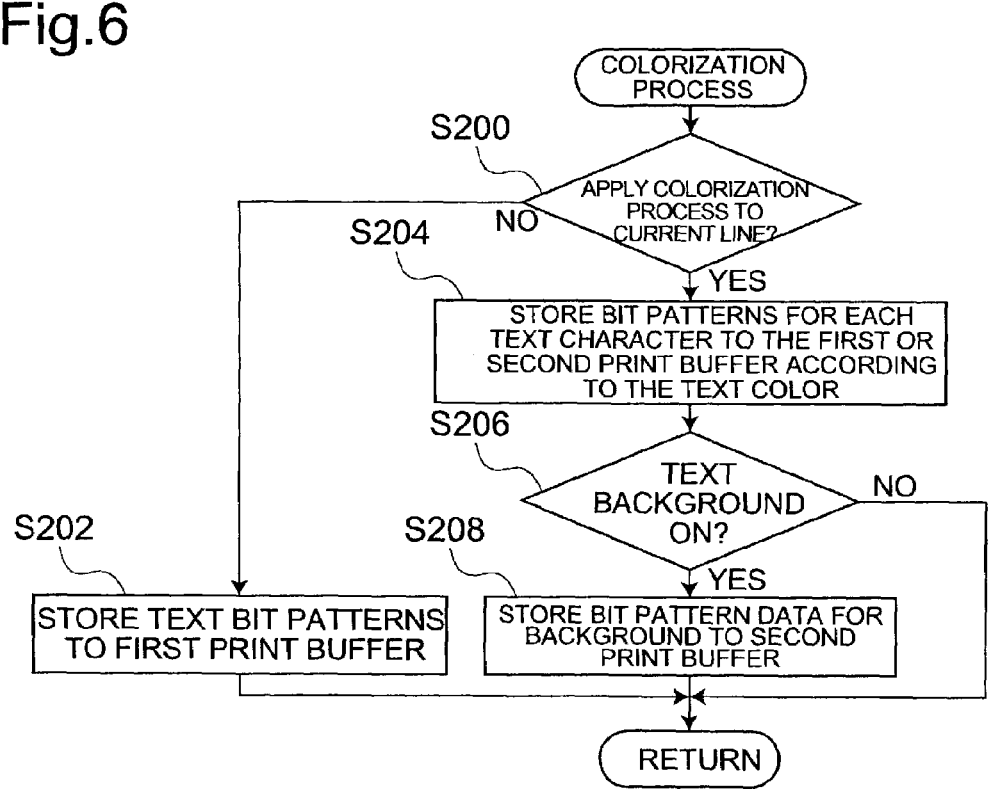
FIG. 6 is a flow chart showing a colorization process for normal characters in the text.
Figure 7:
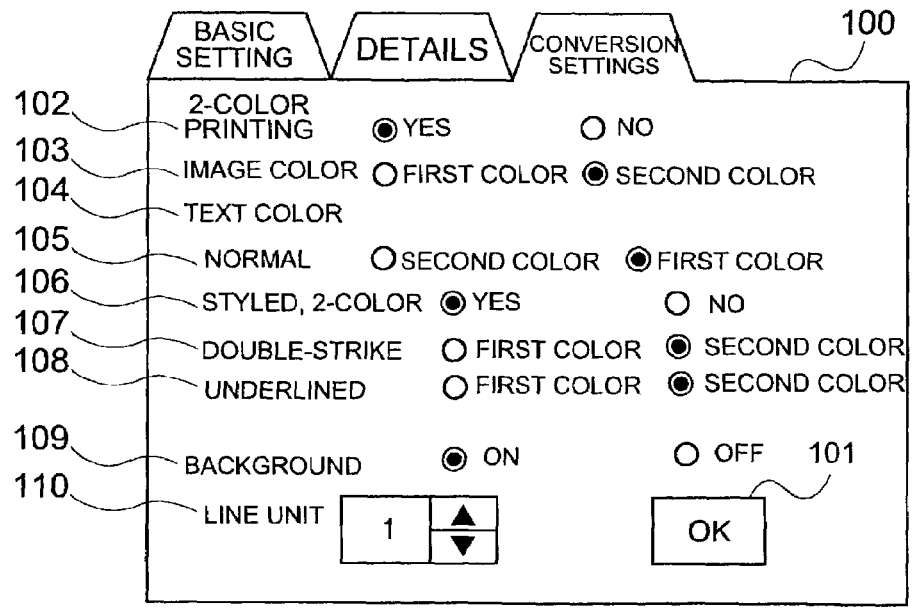
FIG. 7 shows an example of a configuration window for setting the colorization information on the host.

KEY TO THE FIGURES 10 printer
12 host
13 POS application program
14 input device
18 colorization setup program
20 central control unit
22 command interpreter
24 data processing part
26 data configuration unit
28 reception unit
40 CPU
42 RAM
44 ROM
46 first head control unit
48 second head control unit
50 receive buffer
52 first print buffer
54 second print buffer
56 program storage unit
58 CG storage unit
60 image storage unit
62 colorization information storage unit
64 first print head
66 second print head
100 configuration window

What is claimed is:

1. A POS system comprising:

a host device having a POS application execution unit for tabulating sales information based on product information input from a specific input device and outputting receipt printing data;

a graphics user interface, GUI, for optional selection entry of a colorization option for selecting whether monochrome data within said receipt printing data is to be colorized, a color selection option for selecting one of multiple colors, and at least one print feature colorization option for selecting a print feature from within said receipt printing data for colorization; and a printer capable of printing in each of said multiple colors;

wherein:

if said colorization option is selected so that monochrome data within said receipt printing data is not to be colorized, then said printer prints all of said monochrome data within said receipt printing data using only a default color from among said multiple colors;

if said colorization option is selected so that monochrome data within said receipt printing data is to be colorized, then monochrome data matching said print feature is identified, and said printer prints said identified monochrome data using only the selected one of said multiple colors and all other monochrome data is printed using only said default color;

wherein said printer includes a data configuration unit for determining if received monochrome data within receipt printing data coincides with said at least one print feature colorization option, and if a match is found and said colorization option is selected so that monochrome data within said receipt printing data is to be colorized, then said data configuration unit substitutes said selected one of multiple colors in place of said default color during printing of said receipt printing data; and wherein the substitution of said selected one of multiple colors in place of said default color during printing of said receipt printing data is implemented without generation of substitute colorized data for said receipt printing data.

2. The POS system of claim 1, wherein:

said graphics user interface, GUI, further includes an optional selection entry for a combination color selection option for selecting all of said multiple colors; and if said colorization option is selected so that monochrome data within said receipt printing data is to be colorized, then monochrome data matching said print feature is identified, and said printer prints said identified monochrome data using a combination of said multiple colors and all other monochrome data is printed using said default color.

3. The POS system of claim 1, wherein:

said graphics user interface, GUI, for optional selection entry includes multiple print feature colorization options, each individually selectable;

said GUI further includes a separate one of said color selection options associated with each of said multiple print feature colorization options for individually assigning one of said multiple colors to each print feature to be colorized; and if said colorization option is selected so that monochrome data within said receipt printing data is to be colorized, then monochrome data matching any selected ones of said multiple print feature colorization options is identified and associated with the color assigned to its corresponding print feature colorization option, and said printer prints each identified monochrome data using only its associated color and prints all other monochrome data using only said default color.

4. The POS system of claim 3, wherein:

said multiple print feature colorization options include options for styled text, double-strike text, underlined text, background region, or image.

5. The POS system of claim 4, wherein:

said GUI further includes a numeric line grouping selection for grouping consecutive text lines within said receipt printing data into multiple line groups, with each line group consisting of a user-selected number of lines; and said printer adds background shading to alternate, consecutive ones of said line groups when printing said receipt printing data.

6. The POS system of claim 5, wherein said added background shading is printed in a shade color other than said default color.

7. The POS system of claim 5, wherein said shade color is user-selected.

8. The POS system of claim 1, wherein said GUI includes a separate one of said color selection option for each of said at least one print feature colorization option.

9. The POS system of claim 1, wherein:

said printer includes a separate print buffer for each of said multiple colors;

monochrome data to be printed using said default color is sent to a print buffer corresponding to said default color for printing; and identified monochrome data is sent to a print buffer corresponding to said selected one of said multiple colors for printing.

10. The POS system of claim 1, wherein:

said printer includes a separate print buffer for each of said multiple colors including a default print buffer for said default color;

said data configuration unit directs non-colorized monochrome data to said default print buffer for printing in said default color; and said data configuration unit substitutes said selected on of said multiple colors in place of said default color by routing identified monochrome data to a print buffer corresponding to said selected one of said multiple colors.

11. A POS system, comprising:

a host device having a POS application execution unit for tabulating sales information based on product information input from a specific input device and outputting receipt printing data;

a graphics user interface, GUI, for optional selection entry of a colorization option for selecting whether monochrome data within said receipt printing data is to be colorized, and at least one print feature colorization option for selecting a print feature for colorization; and a printer capable of printing in a default color and an alternate color;

wherein:

if said colorization option is selected so that monochrome data within said receipt printing data is not to be colorized, then said printer prints all of said monochrome data within said receipt printing data using only said default color;

if said colorization option is selected so that monochrome data within said receipt printing data is to be colorized, then monochrome data within said receipt printing data matching said print feature is identified, and said printer prints said identified monochrome data using said alternate color and all other monochrome data is printed using said default color;

wherein said printer is a two-color printer with one color designated said default color and the other color designated said alternate color;

wherein said printer includes a data configuration unit for determining if received monochrome data within receipt printing data coincides with said at least one print feature colorization option, and if a match is found and said colorization option is selected so that monochrome data within said receipt printing data is to be colorized, then said data configuration unit substitutes said alternate color in place of said default color during printing of said receipt printing data; and wherein the substitution of said alternate color in place of said default color during printing of said receipt printing data is implemented without generation of substitute colorized data for said receipt printing data.

12. The POS system of claim 11, wherein:

said GUI further includes a numeric line grouping selection for grouping consecutive text lines within said receipt printing data into multiple line groups, with the number of lines within said multiple line groups being user-selectable; and said printer adds background shading to alternate, consecutive ones of said line groups when printing said receipt printing data.

13. The POS system of claim 11, wherein:

said GUI further includes a graphic colorization option for colorizing graphic and image data within said receipt printing data; and if said graphic colorization option is selected, then said printer prints graphic and image data within said receipt printing data using said alternate color.

14. The POS system of claim 13, wherein:

said GUI further includes a color-combination option for concurrently selecting both said default and said alternate color; and if said graphic colorization option and said color-combination option are both selected, then said printer prints graphic and image data within said receipt printing data using both said default and alternate colors.

15. The POS system of claim 11, wherein:

said printer includes a default print buffer for said default color and an alternate print buffer for said alternate color;

monochrome data to be printed using said default color is sent to default print buffer; and identified monochrome data is sent to said alternate print buffer.

16. The POS system of claim 11, wherein:

said printer includes a default print buffer for said default color and an alternate print buffer for said alternate color;

said data configuration unit directs non-colorized monochrome data to said default print buffer for printing in said default color; and said data configuration unit substitutes said selected on of said multiple colors in place of said default color by routing identified monochrome data to said alternate print buffer.

17. A Point-Of-Sale (POS) control method for controlling a POS system having a host device, a graphics user interface (GUI), and a printer having a data configuration unit and capable of printing in multiple colors, comprising:

tabulating on said host device sales information based on product information input from specific input device and having said host device output receipt printing data;

providing via said GUI an optional selection entry of a colorization option for selecting whether monochrome data within said receipt printing data is to be colorized, a color selection option for selecting one of said multiple colors, and at least one print feature colorization option for selecting a print feature from within said receipt printing data for colorization; and if said colorization option is selected so that monochrome data within said receipt printing data is not to be colorized, then having said printer print all of said monochrome data within said receipt printing data using only a default color from among said multiple colors;

else if said colorization option is selected so that monochrome data within said receipt printing data is to be colorized, then identifying monochrome data matching said print feature, and having said printer print the identified monochrome data using only the selected one of said multiple colors and all other monochrome data is printed using only said default color;

having said data configuration unit determine if received monochrome data within receipt printing data coincides with said at least one print feature colorization option, and if a match is found and said colorization option is selected so that monochrome data within said receipt printing data is to be colorized, then having data configuration unit substitute said selected one of multiple colors in place of said default color during printing of said receipt printing data without generation of substitute colorized data for said receipt printing data.

18. The POS control method of claim 17, further comprising:

providing via said GUI an optional selection entry for a combination color selection option for selecting all of said multiple colors; and if said colorization option is selected so that monochrome data within said receipt printing data is to be colorized, and if said combination color selection option is selected for a particular print feature, then having said printer print monochrome data identified a matching said particular print feature using a combination of said multiple colors.

19. The POS control method of claim 17, further comprising:

providing via said GUI, a separate optional selection entry for multiple print feature colorization options;

providing via said GUI, a separate one of said color selection options associated with each of said multiple print feature colorization options for individually assigning one of said multiple colors to each print feature to be colorized; and if said colorization option is selected so that monochrome data within said receipt printing data is to be colorized, then separately identifying monochrome data matching any selected ones of said multiple print feature colorization options and associating each separately identified monochrome data with the color assigned to its corresponding print feature colorization option, and having said printer print each separately identified monochrome data using only its associated color and print all other monochrome data using only said default color.

20. The POS control method of claim 19, wherein:
said multiple print feature colorization options include options for styled text, double-strike text, underlined text, background region, or image.

21. The POS control method of claim 17, further comprising:
providing via said GUI a numeric line grouping selection for grouping consecutive text lines within said receipt printing data into multiple line groups, with each line group consisting of a user-selected number of lines; and
having said printer automatically add background shading to alternate, consecutive ones of said line groups when printing said receipt printing data.

22. The POS control method of claim 17, wherein said printer includes a separate print buffer for each of said multiple colors, said method further including:
having the printer rout monochrome data to be printed using said default color to a print buffer corresponding to said default color for printing; and
having the printer rout identified monochrome data to a print buffer corresponding to said selected one of said multiple colors for printing.

23. The POS system of claim 17, wherein said printer includes a separate print buffer for each of said multiple colors including a default print buffer for said default color, said method further comprising;
having said data configuration unit direct non-colorized monochrome data to said default print buffer for printing in said default color; and
having said data configuration unit substitute said selected on of said multiple colors in place of said default color by routing identified monochrome data to a print buffer corresponding to said selected one of said multiple colors.

* * * * *